(12) United States Patent
Muller et al.

(10) Patent No.: US 11,764,707 B2
(45) Date of Patent: Sep. 19, 2023

(54) MACHINE FOR CONVERTING THERMAL ENERGY INTO ELECTRICAL ENERGY OR VICE VERSA

(71) Applicant: magnoric, Duppigheim (FR)

(72) Inventors: Christian Muller, Strasbourg (FR); Michel Risser, Oberhaslach (FR)

(73) Assignee: magnoric, Duppigheim (FR)

( * ) Notice: Subject to any disclaimer, the term of this patent is extended or adjusted under 35 U.S.C. 154(b) by 0 days.

(21) Appl. No.: 17/922,082

(22) PCT Filed: Jun. 15, 2021

(86) PCT No.: PCT/EP2021/066140
§ 371 (c)(1),
(2) Date: Oct. 28, 2022

(87) PCT Pub. No.: WO2021/255040
PCT Pub. Date: Dec. 23, 2021

(65) Prior Publication Data
US 2023/0170828 A1     Jun. 1, 2023

(30) Foreign Application Priority Data
Jun. 17, 2020 (FR) ...................................... 2006322

(51) Int. Cl.
*H02N 99/00* (2006.01)
*H02N 10/00* (2006.01)
(Continued)

(52) U.S. Cl.
CPC ............... *H02N 99/00* (2013.01); *F02G 5/02* (2013.01); *H02N 10/00* (2013.01); *H02N 11/00* (2013.01)

(58) Field of Classification Search
CPC ........ H02N 99/00; H02N 10/00; H02N 11/00; F02G 5/02
See application file for complete search history.

(56) References Cited

U.S. PATENT DOCUMENTS

| 3,743,866 A | * | 7/1973 | Pirc | H02N 10/00 62/3.1 |
| 4,447,736 A | * | 5/1984 | Katayama | H02N 10/00 310/306 |

(Continued)

OTHER PUBLICATIONS

Search Report and Written Opinion issued in International Application No. PCT/EP2021/066140, dated Sep. 23, 2021.

(Continued)

*Primary Examiner* — Bernard Rojas
(74) *Attorney, Agent, or Firm* — MARSHALL, GERSTEIN & BORUN LLP (57) ABSTRACT

A machine for converting thermal energy originating from waste heat deposits into electrical energy. It uses the magnetic phase transition properties of certain materials when they are exposed to a temperature variation with respect to their Curie temperature. The machine includes a magneto-thermal converter provided with a fixed stator provided with active elements made of the materials, and a mobile rotor provided with magnetic poles and non-magnetic poles. The machine includes a closed fluidic circuit of heat-transfer fluid, coupled with two thermal sources of different temperatures by means of heat exchangers and with the stator to transfer thermal energy collected in the active elements. A synchronization system makes it possible to expose the active elements to alternating thermal cycles to generate a permanent magnetic imbalance between the rotor and the stator, and generate a displacement of the rotor, creating mechanical energy that can be converted into electrical energy.

23 Claims, 5 Drawing Sheets

(51) Int. Cl.
*H02N 11/00* (2006.01)
*F02G 5/02* (2006.01)

(56) References Cited

U.S. PATENT DOCUMENTS

| | | | |
|---|---|---|---|
| 9,998,036 B2 | 6/2018 | Vida | |
| 2011/0048032 A1* | 3/2011 | Chang | F25B 21/00 62/3.1 |
| 2013/0263599 A1* | 10/2013 | Kuo | F03G 3/00 60/682 |
| 2015/0295469 A1* | 10/2015 | Alfasi | H02N 10/00 290/40 R |

OTHER PUBLICATIONS

International Preliminary Report on Patentability issued in International Application No. PCT/EP2021/066140, dated Sep. 28, 2022.

* cited by examiner

MACHINE FOR CONVERTING THERMAL ENERGY INTO ELECTRICAL ENERGY OR VICE VERSA

TECHNICAL FIELD

The present invention relates to a machine for converting thermal energy into electrical energy or conversely converting electrical energy into thermal energy, said conversion machine comprising at least one magnetothermal converter arranged in order to convert temperature variations into mechanical energy or magnetic field variations into thermal energy.

The invention particularly concerns heat conversion, including waste heat, into electrical energy. "Heat" refers to all thermal sources that are hot, i.e. whose temperature is higher than absolute zero (>0 Kelvin). The invention relates more particularly to heat whose temperature is comprised between −100° C. and +100° C.

The invention also concerns the production of thermal energy from mechanical or electrical energy, using the technology developed for the conversion of waste heat. The invention therefore relates to a reversible conversion machine, i.e. that can function according to two inverse operational modes.

BACKGROUND

Waste heat, also called unavoidable energy, corresponds to a thermal energy generated by a method for which it is not the primary purpose, and wherein the heat produced is not recovered and is released into the atmosphere or into any other environment. According to a study by the ADEME (French Ecological Transition Agency) carried out in September 2017, French industry has a waste heat potential of 109.5 TWh (terawatt hours), i.e., 36% of its fuel consumption, of which 56.6 TWh are lost at less than 100° C. In addition to this deposit, 8.4 TWh of heat is released in sewage treatment plants, household waste incineration plants, Datacenters, hospitals, and other tertiary sites.

In industry, we can cite by way of example a combustion process of a combustible in a furnace whose useful energy is only 20% to 40%. The remaining 60% to 80% of the heat produced by this oven is therefore waste heat if it is not recovered. This example extends to all other thermal sources from thermal power stations, nuclear power stations, cement works, solar thermal power stations, gas liquefaction processes, without this list being exhaustive.

Depending on the industrial processes, waste heat can take several forms: gaseous emissions (e.g., furnace fumes), liquid discharges (e.g., boilers), or diffuse discharge (e.g., insulation leaks in a thermal system). Waste heat temperatures extend over a very wide range, from −100° C. to over +500° C.

For waste heat whose temperature is more than 150° C., there are many technologies for generating electricity through heat conversion (Rankin cycle, reverse thermoelectric conversion based on the Seebeck effect, molten salts, etc.). These technologies are particularly costly and complex, and are not cost-effective nor efficient enough to recycle waste heat whose temperature is less than 100° C., also referred to as "low-grade thermal discharge."

For low-grade thermal discharge, existing technologies only offer a low conversion rate of less than 30% in comparison with the yield of the Carnot cycle. Publications US 2015/0295469 A1 and U.S. Pat. No. 9,998,036 B2 propose a technology based on the magnetic phase transition of certain metal materials, but limited to the use of waste heat in the form of liquid discharge. This technology is difficult to implement, cumbersome, very inefficient and therefore limited in its applications. Indeed, it requires a high consumption of liquid discharge for a conversion rate of less than 20% compared to the yield of the Carnot cycle. To date, it is not exploited industrially.

Faced with the challenges of energy transition, waste heat recovery and recycling from all sectors (industrial, tertiary, residential) constitute significant energy-saving potential, and as a result, a significantly lower impact on global warming by drastically reducing thermal emissions into the atmosphere. In addition, waste heat is a source of thermal energy that is widely available throughout the world.

In addition, there is no technology at this time based on the magnetic phase transition of certain metal materials that is reversible and capable of producing both electrical energy from thermal energy in a first operating mode, and thermal energy from electrical energy in a second operating mode, in particular for air conditioning, refrigeration, heating, tempering, drying or similar applications.

SUMMARY OF THE DISCLOSURE

The present invention aims to overcome these drawbacks by proposing a reversible, industrializable, compact, reliable and safe conversion machine in compliance with the standards in terms of magnetic fields and pressure, implementing a low-constraint, low-maintenance mechanism thus offering a long service life using a technology based on the magnetic phase transition of certain materials, offering a high conversion rate of more than 60% in comparison with the yield of the Carnot cycle, without any negative impact on the environment or on the landscape, able to exploit thermal energy deposits in different forms to produce green and renewable electrical energy, but also to produce magnetic cooling, by means of a modular, reversible technology, easily configurable according to target outputs and the temperatures of the energy deposits or the refrigeration temperatures and/or heating to be reached.

For this purpose, the invention relates to a conversion machine as defined in claim 1.

The compact design of the magnetothermal converter, wherein the alternated arrangement of the active elements of the first group and the active elements of the second group distributed in the stator corresponds to the alternating arrangement of the magnetic and non-magnetic poles of the rotor, makes it possible to exploit to the maximum all the active elements and the poles of the rotor and significantly improve the performance and thermal efficiency of the magnetothermal converter.

In a first embodiment, said magnetothermal converter may comprise a fixed magnetic frame superimposed on said rotor to delimit between them an air gap wherein said stator is positioned, said magnetic frame being arranged to channel the magnetic flow and close the field lines of the magnetic poles of said rotor through said stator and said active elements.

In a second embodiment, said magnetothermal converter may comprise two superimposed rotors to delimit between them an air gap wherein said stator is positioned, the two rotors having the same number of magnetic and non-magnetic poles, and being arranged to channel the magnetic flow and close the field lines of the magnetic poles of the two rotors through said stator and said active elements. In this case, the two rotors can be coupled by mechanical connection or by magnetic coupling.

In a preferred form of the invention, said stator comprises or forms a thermally insulating support on which said active elements are fixed, as well as fluidic connections, in order to allow communication between said fluidic circuit and said active elements. Said stator advantageously comprises a number of active elements that is a multiple of the number of magnetic and non-magnetic poles of said at least one rotor, so that the same number or the same quantity of active elements is opposite each magnetic and non-magnetic poles.

Said fluidic circuit may comprise a heat-transfer fluid selected from the group comprising an aqueous solution with or without additive, a gaseous medium, a liquefied gas, a petroleum product. It may also comprise a pump, two heat exchangers and two circulation loops for said heat-transfer fluid connected in parallel by a synchronization system. In this case, said synchronization system is arranged to connect in series said active elements respectively from said first group and from said second group with said heat exchangers alternately in one and the other of said circulation loops.

Said synchronization system advantageously comprises fluidic distributors controlled according to a switching frequency determined by an actuator selected from mechanical, hydraulic, electric and/or electronic actuators. Furthermore, they can be controlled by said at least one rotor of the magnetothermal converter and a mechanical cam transmission, by a variable-speed auxiliary motor and a mechanical cam transmission, or by a programmable electric or electronic cam.

Said fluidic circuit may further comprise a buffer tank of heat-transfer fluid connected in series with each of said circulation loops. More preferably, it also comprises control units for the direction of circulation of said heat-transfer fluid arranged to make the heat-transfer fluid circulate in each of said heat exchangers in a single direction of circulation.

Said active elements may comprise at least one of the materials selected from the group comprising gadolinium (Gd), a gadolinium (Gd) alloy, an iron (Fe) alloy, a manganese (Mn) alloy, a lanthanum (La), said alloys comprising at least one of the materials selected from the group comprising at least silicon (Si), germanium (Ge), iron (Fe), magnesium (Mg), phosphorus (P), manganese (Mn), hydrogen (H), arsenic (As), or a combination of certain said materials. And said material can be in one of the forms selected from the group comprising a sheet, a porous block, a block of sheets, a pellet, powder, an agglomerate of pieces.

In the preferred form of the invention, said magnetothermal converter has an annular configuration, said stator and said at least one rotor being superimposed radially and extending axially. In this case, at least one part of the fluidic passages provided in said active elements opens axially, and said fluidic connections are arranged in at least one axial end of said stator.

In this annular configuration, said active elements are advantageously in the forms of bars, extending axially in said stator, and each can consist of a block of porous material or a block of layered sheets of material and delimiting between them said fluidic passages.

The magnetic poles of said at least one rotor can be obtained by a magnetic assembly selected from the group comprising one or more permanent magnets, ferrites, an electromagnet, a superconducting magnet, a superconducting electromagnet, a superconductor, a combination of these solutions, while the non-magnetic poles of said at least one rotor can be obtained by the absence of magnetic assembly.

As a variant embodiment, at least one of the magnetic poles of said stator or of said at least one rotor can be offset with respect to the other symmetrical magnetic poles of said stator or of said at least one rotor, to introduce a permanent magnetic imbalance between said stator and said at least one rotor.

Said conversion machine may comprise several magnetothermal converters connected in series, in parallel, or in a series-parallel combination, to increase the conversion power.

When said conversion machine is intended to convert electrical energy into thermal energy, then it further comprises an actuator coupled with said at least one rotor of said magnetothermal converter to expose said active elements to a variable magnetic field and creating alternately in said active elements a magnetocaloric heating cycle and a magnetocaloric cooling cycle. In this case, said fluidic circuit is coupled on the one hand with said stator to collect the thermal energy produced by said active elements, and on the other hand with an external device via at least one heat exchanger to transfer thermal energy produced and simultaneously isolating said conversion machine from said at least one external device, said magnetic modulation unit comprising said at least one rotor and a synchronization system arranged to synchronize the circulation of the heat-transfer fluid of the fluidic circuit in said active elements with said magnetocaloric cycles.

In this mode of operation, said active elements can advantageously have an assembly of magnetocaloric materials of different Curie temperatures, organized in ascending or descending order.

When said conversion machine is intended to convert thermal energy into electrical energy from a first thermal source at a first temperature and from a second thermal source at a second temperature different from the first temperature, then it further comprises an electromechanical converter coupled with said at least one rotor of said magnetothermal converter to convert mechanical energy into electrical energy. In this case, said fluidic circuit is coupled on the one hand with said first thermal source via a first heat exchanger and with said second thermal source via a second heat exchanger to collect the thermal energy and simultaneously isolate said conversion machine from said thermal sources, and is coupled on the other hand with said stator to transfer the collected thermal energy to said active elements, and said thermal modulation unit has a synchronization system arranged to expose said active elements to temperature variations, generating a permanent magnetic imbalance between said at least one rotor and said stator, and generating a displacement of said at least one rotor to create said mechanical energy.

In this mode of operation, said electromechanical converter is an electric generator, the rotor of said electric generator being coupled with said at least one rotor of said magnetothermal converter directly, or by means of a speed reducer or multiplier, to adapt the speeds of said rotors.

In this mode of operation, the invention also relates to the use of a machine for converting thermal energy into electrical energy as defined above to recover thermal energy resulting from waste heat lost in a temperature range of −100° C. to +100° C. Preferably, the difference of temperature between the first thermal source and the second thermal source is at least equal to 10° C. And said conversion machine is arranged to achieve a conversion rate of more than 60% in comparison with the yield of the Carnot cycle.

BRIEF DESCRIPTION OF THE FIGURES

The present invention and its advantages will be more apparent in the following description of several embodiments provided as non-limiting examples, with reference to the annexed drawings, wherein.

DETAILED DESCRIPTION

In the illustrated examples of embodiment, the identical elements or parts bear the same reference numbers. Also, terms that have a relative meaning, such as vertical, horizontal, right, left, front, back, above, below, etc. must be interpreted under normal conditions of use of the invention, and as represented in the figures.

Figure 1:
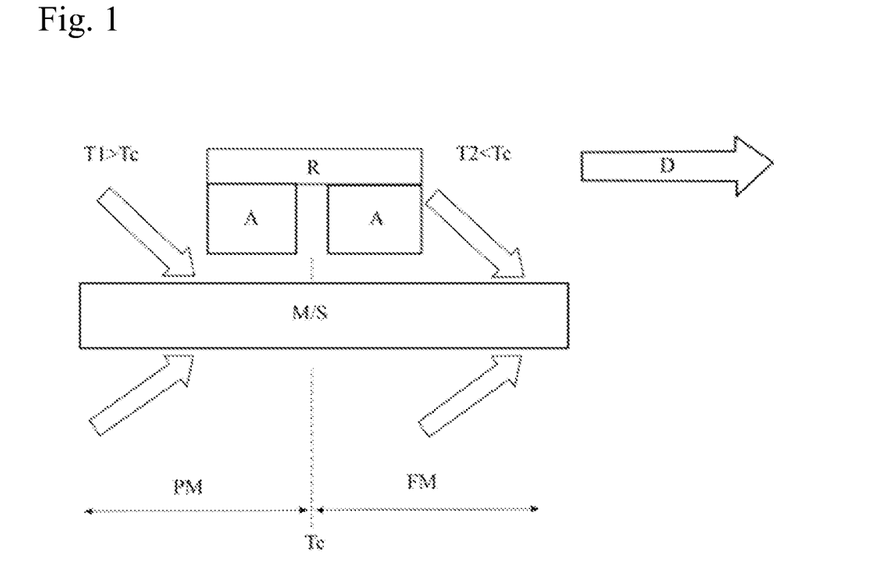
FIG. 1 is a diagram illustrating the principle used in the invention based on the magnetic phase transition of a metal material to convert thermal energy into mechanical energy that can be transformed into electrical energy.

The conversion machine 1, 100 according to the invention, making it possible to convert thermal energy into electrical energy, uses a technology based on the magnetic phase transition of certain materials when they are exposed to a temperature variation with respect to a transition temperature Tc. The transition temperature Tc is the Curie temperature or Curie point at which a ferromagnetic (FM) material loses its magnetization. The material then becomes paramagnetic (PM). FIG. 1 schematically illustrates the principle used in the invention. The magnetic phase transition material M is schematized by a bar of material, subsequently called active element 4, and supported by or integrated into a fixed stator S. It cooperates with magnets A, e.g., permanent magnets, forming the magnetic poles 5 of a mobile rotor R shifting or rotational with respect to the stator S. In FIG. 1, the rotor R shifts according to the arrow D. When the material M is exposed to a temperature T1 higher than the transition temperature Tc (on the left of FIG. 1), it goes from a ferromagnetic state to a paramagnetic state PM in which it has no effect on the two magnets A, or on the rotor R. Then, when the material M is exposed to a temperature T2 lower than the transition temperature Tc (on the right of FIG. 1), it returns to a ferromagnetic state FM wherein it favors the passage of a magnetic flow between the two magnets A, and creates a magnetic imbalance with the rotor R which moves in the direction of the arrow D to find a position of magnetic balance. By repeating this thermal cycle at a defined frequency, the rotor R will follow the material M in its ferromagnetic state by following the thermal zones generated by the temperature variations. The displacement of the rotor R then creates mechanical energy which can be transformed into electrical energy. The displacement of the rotor R can be alternative if the rotor R is linear as shown in FIG. 1, or continuous if the rotor R is rotary as shown in the other FIGS. 2 to 8.

The mechanical energy produced will depend on the nature of the materials and their transition temperature Tc, the intensity of the magnetic field of rotor R, the number of magnetic poles 5, the frequency of the thermal cycles and the difference between the temperatures T1 and T2.

Materials with magnetic phase transition may be selected in the group comprising gadolinium (Gd), a gadolinium (Gd) alloy, an iron (Fe) alloy, a manganese (Mn) alloy, a lanthanum (La), said alloys comprising at least one of the materials selected from the group comprising at least silicon (Si), germanium (Ge), iron (Fe), magnesium (Mg), phosphorus (P), manganese (Mn), hydrogen (H), arsenic (As). In addition, materials with magnetic phase transition may come in different forms such as those selected in the group comprising a sheet that is plane or not, a porous block, a block of layered sheets, a pellet, powder, an agglomerate of pieces.

The level of the transition temperature Tc of these materials makes it possible to effectively exploit low-grade thermal deposits situated, for example, in a temperature range from −100° C. to +100° C. Furthermore, the difference between the temperatures T1 and T2 can be minor, and at least equal to 10° C.

Figure 2:
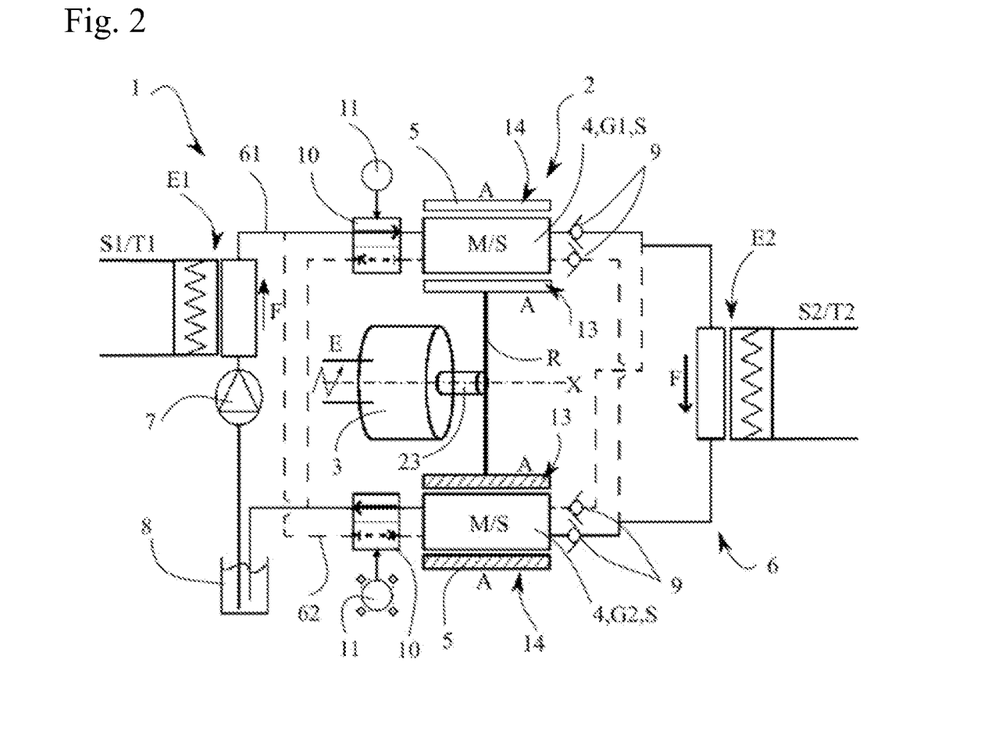
FIG. 2 is an operating diagram of a conversion machine according to the invention.

FIG. 2 schematically illustrates the operation of a conversion machine 1 according to the invention comprising a magnetothermal converter 2 arranged to convert temperature variations into mechanical energy, and an electromechanical converter 3 coupled with the magnetothermal converter 2, arranged to convert the mechanical energy into electrical energy E. It further comprises a thermal modulation unit arranged to collect the thermal energy from a first thermal source S1 at a first temperature T1 and from a second thermal source S2 at a second temperature T2 different from the first temperature T1, and to transfer it to the magnetothermal converter 2.

The magnetothermal converter 2 has a fixed stator S provided with magnetic phase transition material M which constitutes active elements 4, and a mobile rotor R in rotation around an axis X provided with magnets A which constitute magnetic poles 5. In FIG. 2 and solely for the purpose of explaining the operation of the machine 1, only two active elements 4 and only two magnetic poles 5 are represented.

The thermal modulation unit comprises a fluidic circuit 6 inside of the magnetothermal converter 2, closed and independent of the thermal sources. Indeed, the fluidic circuit 6 is coupled with the first thermal source S1 by means of a first heat exchanger E1 and with the second thermal source S2 by means of a second heat exchanger E2 to collect the thermal energy. The heat exchangers E1, E2 therefore have the advantage of isolating the fluidic circuit 6 as well as the magnetothermal converter 2 and the whole of the conversion machine 1 from the thermal sources S1, S2. Heat exchangers E1, E2 can also be liquid/liquid, gas/gas, or liquid/gas exchangers, depending on the nature of the thermal sources and that of the heat-transfer fluid. Therefore, the conversion machine 1 operates in a closed circuit, i.e., in a dry environment, which makes it possible to exploit the available thermal sources S1, S2 entirely, without loss or waste, as is particularly the case in state-of-the-art solutions that function in a humid environment.

The fluidic circuit 6 is also coupled with the stator S to transfer the thermal energy collected to the active elements 4 which it places in series with the heat exchangers E1 and E2. To this end, the fluidic circuit 6 comprises a pump 7 arranged to circulate a heat-transfer fluid through the heat exchangers E1 and E2 and the active elements 4. The heat-transfer fluid can consist of any fluid capable of transporting thermal energy from one point to another without loss, liquid or gaseous, such as an aqueous solution with or without additive, a gaseous medium, a liquefied gas, etc., this fluid being selected according to the machine's operating temperatures. The aqueous solution can be pure water or with an antifreeze additive such as glycol and/or anti-corrosion such as soda and/or any other additive depending on the operating conditions of the heat-transfer fluid.

The fluidic circuit 6 comprises two circulation loops 61, 62 of heat-transfer fluid connected in parallel by a synchronization system arranged to connect the active elements 4 in series with the heat exchangers E1, E2, alternately in one and the other circulation loops 61, 62 to create alternating thermal cycles at a determined frequency, generating a permanent magnetic imbalance between the rotor R and the stator S, and producing a displacement of the rotor R.

The synchronization system comprises fluidic distributors 10 controlled according to a switching frequency determined by an actuator 11. The fluidic distributors 10 can consist of two-way ball or spool valves. The actuator 11 may be selected among mechanical, hydraulic, electric and/or electronic actuators. For example, the actuator 11 can be separated from the magnetothermal converter 2 and consist of an auxiliary or dedicated variable-speed motor, and coupled with the fluidic distributors 10 by a mechanical transmission. It can be integrated into said converter and consist of the rotor R of the magnetothermal converter 2, coupled with the fluidic distributors 10 by a mechanical transmission. In these two examples, the mechanical transmission can advantageously be a cam transmission 26 (see FIG. 5). The actuator 11 can also consist of an electric or electronic cam controlled by a programmable electronic card. These examples are of course non-limiting.

The fluidic circuit 6 comprises a buffer tank 8 of heat-transfer fluid connected in series with each of the circulation loops 61, 62. It further comprises control units 9 for the direction of circulation of the heat-transfer fluid in the circulation loops 61, 62 to impose a single direction of circulation of the heat-transfer fluid in the heat exchangers E1, E2, illustrated by the arrows F. The control units 9 may consist of one-way valves, for example ball valves, only allowing the passage of fluid in one direction of circulation.

Referring to FIG. 2, the function of the conversion machine 1 is described. In a first thermal cycle, the fluidic distributors 10 are in a first position, as illustrated in FIG. 2 and the heat-transfer fluid circulates in a first circulation loop 61 represented as a solid line from the buffer tank 8, via the pump 7. It passes through the first heat exchanger E1 to recover the thermal energy at a temperature T1 from a first heat source S1 and greater than the transition temperature Tc, passes through an active element 4 situated at the top of FIG. 2, which changes into a paramagnetic state having no effect on the magnets A of the rotor R (magnets without hachures), passes through the second heat exchanger E2 to recover the thermal energy at a temperature T2 from a second heat source S2 and lower than the transition temperature Tc, passes through an active element 4 located at the bottom of FIG. 2, which changes into a ferromagnetic state favoring the conduction of the magnetic flow between the magnets A of the rotor R (magnets with hachures) and inducing the rotation of the rotor R around the axis X, then returning to the buffer tank 8.

In a second thermal cycle, the fluidic distributors 10 are in a second position, not shown in FIG. 2, and the heat-transfer fluid circulates in a second circulation loop 62 represented as a solid line from the buffer tank 8, via the pump 7. It passes through the first heat exchanger E1 to recover the thermal energy at a temperature T1 from a first heat source S1 and greater than the transition temperature Tc, passes through an active element 4 located at the bottom of FIG. 2, which changes into a paramagnetic state having no effect on the magnets A of the rotor R, passes through the second heat exchanger E2 to recover the thermal energy at a temperature T2 from a second heat source S2 and lower than the transition temperature Tc, passes through an active element 4 located at the top of FIG. 2, which changes into a ferromagnetic state favoring the conduction of the magnetic flow between the magnets A of the rotor R and inducing the rotation of the rotor R around the axis X, then returning to the buffer tank 8.

The first and second thermal cycles are repeated at a frequency by means of the synchronization system which controls the switching of the fluidic distributors 10, by creating an alternation of paramagnetic and ferromagnetic phases in the active elements 4, and by generating a rotation torque on the rotor R. The heat-transfer fluid circulates in the active elements 4 in one direction in the first circulation loop 61, and in the opposite direction in the second circulation loop 62, but always circulates in the same direction according to the arrow F in the heat exchangers E1, E2.

Figure 3:
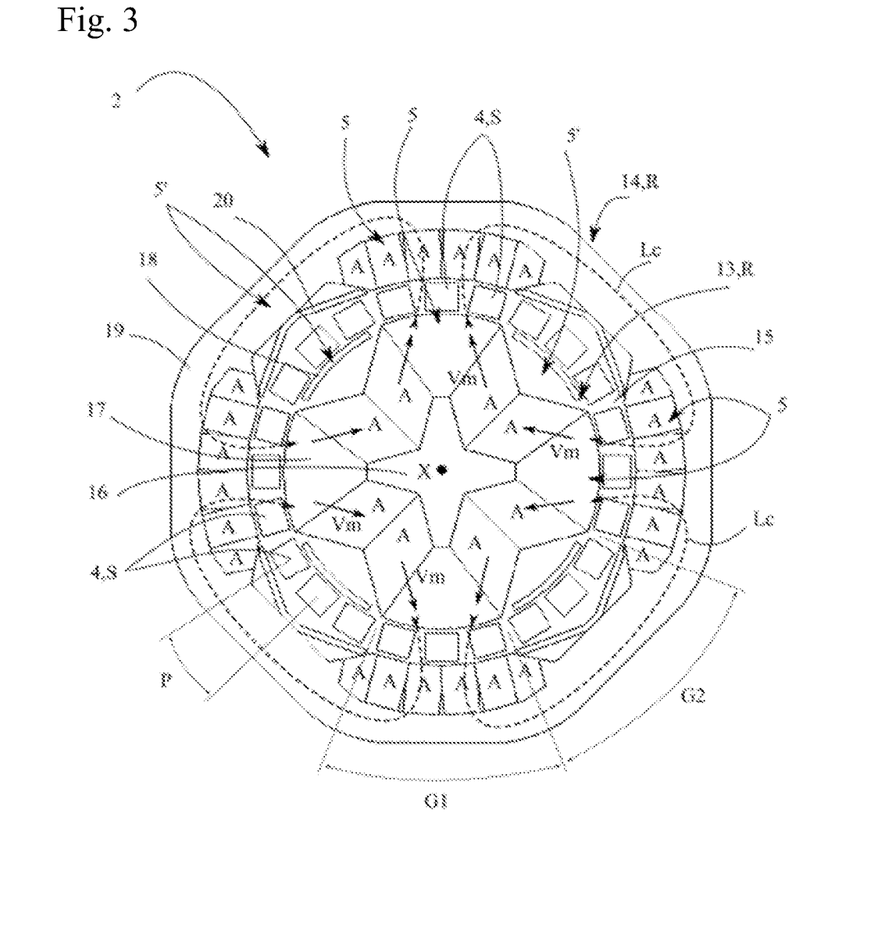
FIG. 3 is a plan view of the magnetothermal converter of the machine of FIG. 2.
Figure 4:
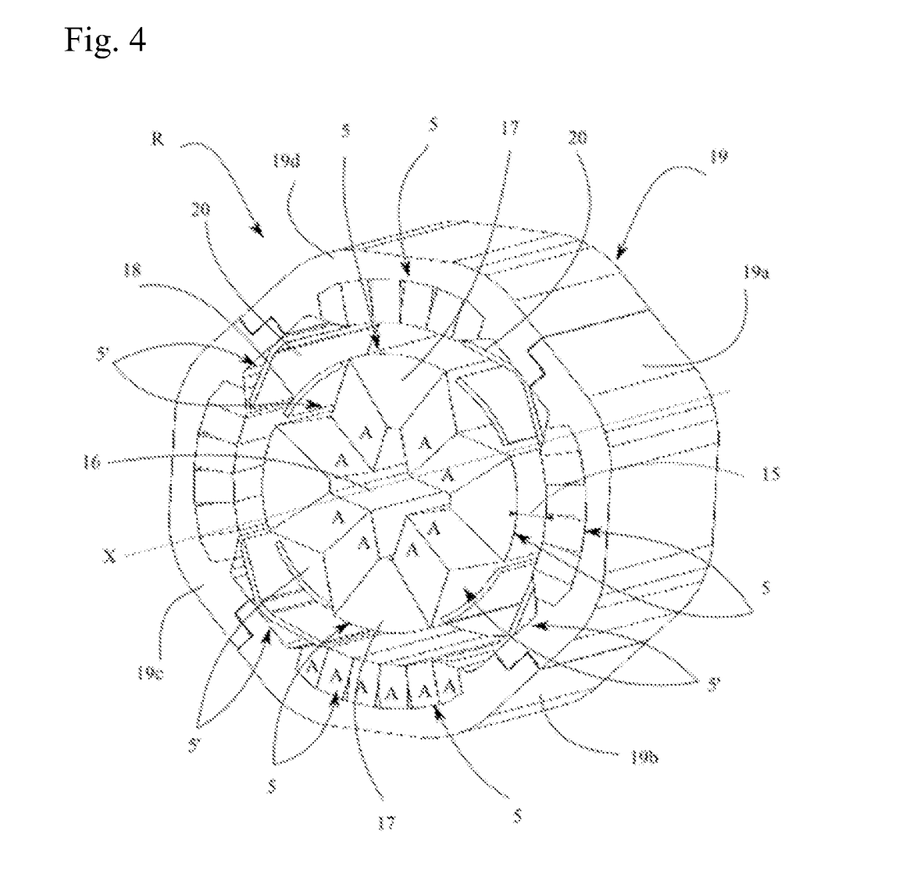
FIG. 4 is a perspective view of the rotor of the magnetothermal converter of FIG. 3.
Figure 5:
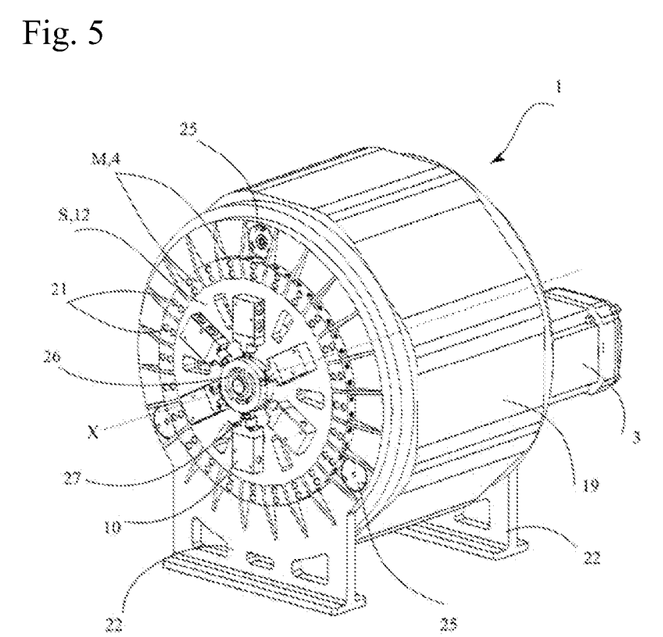
FIG. 5 represents in perspective a conversion machine according to the invention, seen from the fluid control side.
Figure 6:
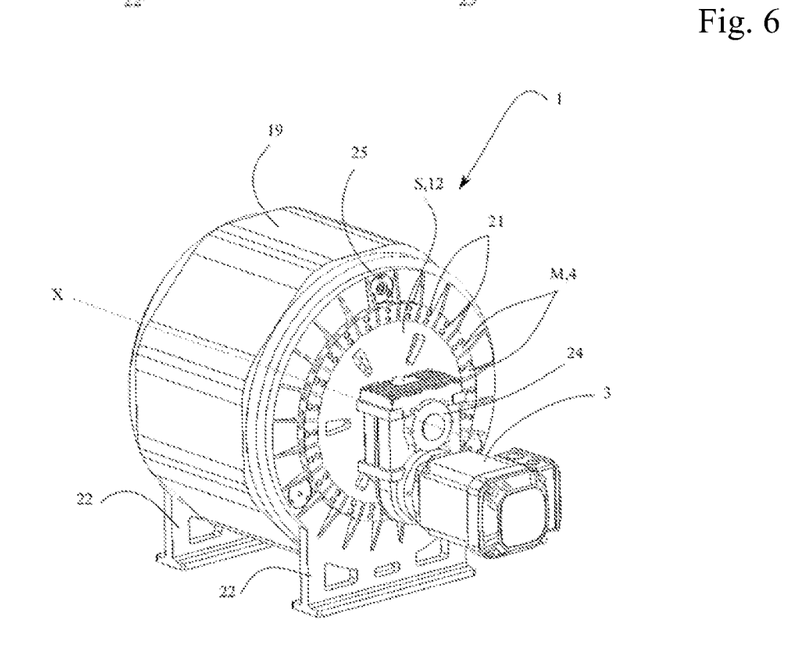
FIG. 6 represents in perspective the conversion machine of FIG. 5, seen from the side of the electromechanical converter.
Figure 7:
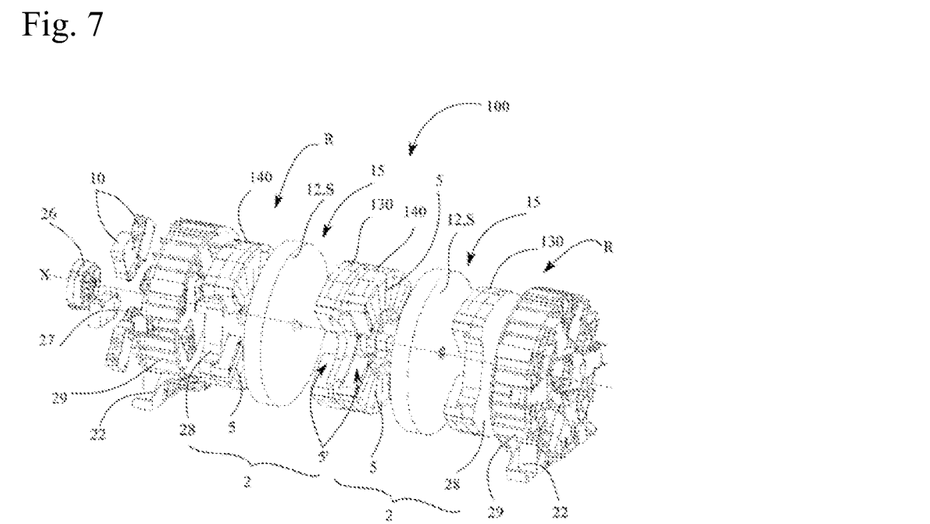
FIG. 7 is an exploded view of a conversion machine according to the invention provided with two thermal stages.

The magnetothermal converter 2 of FIG. 2 is represented in more detail in FIGS. 3 and 4, in a rotational configuration, this example remaining non-limiting. A linear configuration is quite feasible, wherein the stator S and the rotor R are laid flat. It enters a conversion machine 1 as represented in FIGS. 5 to 7. The active elements 4 are supported by an annular or disk-shaped support 12 (FIG. 7), centered on the axis X. The support 12 constitutes or is an integral part of a fixed stator S. The rotor R is also of annular or disk-shape, centered on the axis X, complementary to the stator S. The rotor R consists, in the example of FIGS. 3 and 4, of two rotors 13, 14 superposed radially: an inner rotor 13 and an outer rotor 14, coaxial and centered on the axis X, separated from each other by an air gap 15 wherein the stator S is housed. This configuration is non-limiting since the two rotors can also be superimposed axially (see FIG. 7). This configuration makes it possible to intensify the magnetic field in the air gap 15 and to increase the efficiency of the magnetic drive of the rotor R by the active elements 4 alternating the paramagnetic and ferromagnetic phases since they are alternately opposite a magnetic pole. 5 when they are in the paramagnetic phase and opposite a non-magnetic pole 5' when they are in the ferromagnetic phase, permanently creating a magnetic imbalance in the rotor R. In this configuration, wherein the stator S is housed in the air gap 15 between the two rotors 13, 14, the magnetic effects of the rotors 13, 14 and those of the active elements 4 have the advantage of combining and being amplified, having the effect of increasing the mechanical energy produced.

The inner 13 and outer 14 rotors have the same number of magnetic poles 5 and non-magnetic poles 5'. A "non-magnetic pole" is a pole which does not generate a magnetic field and which in fact does not comprise a magnet or a ferrite, or any other means generating a magnetic field. In addition, and for each rotor 13, 14, the number of magnetic poles 5 is equal to the number of non-magnetic poles 5'. The inner 13 and outer 14 rotors are coupled together to rotate synchronously. They may be coupled by a mechanical transmission, such as a gear train, a belt and pulley system, a chain and sprocket system, or similar. They can also be coupled together magnetically, therefore without contact. In the example of FIGS. 3 and 4, the rotor R comprises four magnetic poles 5 and four non-magnetic poles 5', alternated and regularly distributed. Thus, they each extend over an angular sector of identical value. Of course, the number of magnetic poles 5 is not limited to four and can be equal to two (see FIG. 7) or greater than four.

The inner rotor 13 has a cylindrical shape and comprises a central core 16 which is preferably non-magnetic or not very magnetic. It can be hollow and empty, openwork or solid and made of a material such as aluminum, stainless steel, or similar. The inner rotor 13 comprises magnets A, such as permanent magnets or ferrites, divided into four pairs of magnets A, connected together by magnetic parts 17 to form four magnetic poles 5, distributed at right angles to each other around the central core 16. The magnetic pieces 17 can be made of soft iron, soft steel, or similar. It can be supplemented by deflectors 18 preferably magnetizable, ferromagnetic or magnetic, arranged on the outer periphery of the inner rotor 13, in line with the non-magnetic poles 5' and between two magnetic parts 17, to channel and concentrate the magnetic flow Lc only in the magnetic poles 5 and the corresponding air gap 15, having the effect of limiting or even eliminating any field line leaks.

The outer rotor 14 comprises a magnetic frame 19. It can be made of soft iron, soft steel, or similar. It supports magnets A or ferrites, divided into four groups of six magnets A, to form four magnetic poles 5, distributed at right angles to one another. The non-magnetic poles 5' which are empty of magnets A, can comprise a preferably magnetizable, ferromagnetic, or magnetic deflector 20 positioned on the inner periphery of the outer rotor 14, to channel and concentrate the magnetic flow Lc only in the magnetic poles 5 and the corresponding air gap 15, having the effect of limiting or even eliminating any field line leaks. The magnetic vectors Vm and the field lines Lc are represented schematically in FIG. 3. The magnetic flow produced by each magnetic pole 5 of the inner rotor 13 closes in on itself when passing through the air gap 15, the stator S, the magnetic poles 5 corresponding to the outer rotor 14 and the magnetic frame 19.

The magnetic poles 5 of the rotor R may advantageously comprise permanent magnets or ferrites, each pole possibly being formed of one or more permanent magnets. Magnets A are selected to generate a magnetic flow density of at least 0.2 to 2 Teslas. They can also comprise other magnetic field generators, such as those selected from the group comprising a magnetic assembly (combination of permanent magnets and/or ferrites and magnetic parts), an electromagnet, a superconducting magnet, a superconducting electromagnet, a superconductor. Therefore, the term "magnet A" used in the description extends to all embodiments of magnetic field generators.

FIG. 4 shows only the rotor R of FIG. 3 in perspective, without the stator S. The frame 19 can be made of one or more parts, and, for example, in four identical parts 19a, 19b, 19c, 19d, assembled by complementary interlocking forms. Of course, any other means of construction may be suitable.

In a variant embodiment not shown, the rotor R may only comprise a single rotor. In this case, the conversion machine 1 comprises a fixed magnetic frame disposed opposite the rotor R with respect to the stator S to create an air gap wherein said stator S is housed. The magnetic frame can be linked to the stator S. It can be made of soft iron, soft steel, or similar, to channel the magnetic flow generated by the magnets A of the rotor R and close the field lines Lc on the magnetic poles 5 of the rotor R passing through the stator S.

In yet another variant embodiment not shown, at least one of the magnetic poles 5 of the stator S or of the rotor R can be angularly offset with respect to the other magnetic poles 5 which are symmetrical with respect to the axis X, with the purpose of introducing a permanent magnetic imbalance between the stator S and the rotor R. This angular offset is carried out during the construction of the rotor R or the stator S. In the case of a linear machine, the offset is introduced at the level of the pitch which separates the magnetic poles.

The stator S comprises a number of active elements 4 which is determined according to the number of poles 5, 5' of the magnetothermal converter 2. The number of active elements 4 is more preferably equal to a multiple of the number of magnetic poles 5 and non-magnetic poles 5' of the rotor R, this multiple possibly being equal to one. In the example shown in FIGS. 3 and 4, the number of active elements 4 is equal to twenty-four, a multiple equal to three for eight poles 5, 5'. In this way, a distribution of three active elements 4 per magnetic pole 5 and three active elements 4 per non-magnetic pole 5' is obtained. The active elements 4 are distributed over the perimeter of the stator S, and separated from each other by a pitch P, which is preferably regular and as small as possible to maximize the quantity of active elements 4 in the stator S. They are further assembled into a first group G1 of active elements 4, and into a second group G2 of active elements 4. The active elements 4 of the first group G1 are alternated with the active elements 4 of the second group G2 so as to create a magnetic alternation in the stator S between active elements 4 in a ferromagnetic state favoring the passage of a magnetic flow, and active elements 4 in a paramagnetic state preventing the passage of a magnetic flow. This alternating arrangement corresponds to the alternating arrangement of the magnetic poles 5 and the non-magnetic poles 5', as can be seen in FIG. 3. In addition, the magnetic alternation generated within the stator S varies according to the thermal cycles generated by the thermal modulation unit to create a permanent magnetic imbalance between the stator S and the rotor R and generate a displacement of the rotor R to create mechanical energy.

The stator S or the support 12 of the active elements 4 is preferably realized in a thermally insulating and magnetically neutral material, such as, for example, a polymer-based synthetic material, a carbon fiber-based composite material, stainless steel, a natural resin or silicone-based material, or similar. It further comprises fluidic connections 21 (see FIGS. 5 and 6) to allow the fluidic circuit 6 to communicate with the active elements 4. The active elements 4 being fixed, the fluidic connections 21 are simple, non-rotating connections. They form fluid input and output openings in or near each active element 4 and make it possible to connect the pipes (not shown) forming the fluidic loops 61, 62 (see FIG. 2). The active elements 4 comprise for this purpose fluidic passages (not shown) which can be defined by a form selected from the group comprising pores, perforations, grooves, slots, interstices, or a combination of these shapes. These forms may further be obtained by rolling, extrusion, machining, three-dimensional printing, chemical, ionic or mechanical etching, forming, spacers between blocks, plates or sheets, spaces between particles, orifices in a porous block, or a combination of these means. The fluidic passages are preferably of small size, between 0.01 mm and 5 mm and preferably equal to 0.15 mm, capable of creating a flow of heat-transfer fluid through the active elements 4, these values remaining non-limiting. Preference will be given to a substantially laminar flow.

In the case of a magnetothermal converter 2 of annular configuration, such as that represented in FIGS. 3 to 6 and 8, the stator S and the rotors R, 13, 14 are superimposed radially and extend axially parallel to the axis X. The active elements 4 can thus be in the form of bars which also extend axially. The bars of active elements 4 can be obtained in different ways, from porous blocks, perforated blocks, sheets, or plates stacked and separated from one another by spacers or any other similar means to create fluid passages. The bars of active elements 4 advantageously have a parallelepiped geometrical shape, consisting of sheets of rectangular, thin, identical materials, stacked radially or axially, parallel to each other and separated by an interval forming said fluidic passages. By way of example, the sheets of material may have a length of between 10 mm and 150 mm, a height or a width of between 10 mm and 48 mm, and a thickness of between 0.1 mm and 4 mm, these values remaining non-limiting. They are grouped together in packs of N sheets, N possibly being between 10 and 150, for example, to form the bars of active elements 4, these values remaining non-limiting. The sheets of materials from the same pack can be maintained together by any suitable means, such as, for example, local deformations in their thickness to create support points, a spacer, a U-shaped or L-shaped profile, a divider made of a calibrated thickness of glue. Each active element 4 thus forms a single-block piece which can be placed in an independent rectangular housing provided in the stator S or the support 12. This arrangement makes it possible to independently disassemble each active element 4 of the stator S without disassembling all of the active elements 4, which greatly simplifies the manufacture and implementation of said active elements 4.

Flat and narrow fluidic passages have the advantage of favoring a laminar flow of the heat-transfer fluid parallel to the axis X. In addition, they have the advantage of axially opening the active elements 4, making it possible to arrange the fluidic connections 21 in at least one of the axial ends of the stator S. The fluidic connections 21 are situated near the fluidic distributors 10, making it possible to reduce to a minimum the length of the fluidic loop pipes 61, 62. This annular machine and active element configuration in the shape of a bar consequently offers several advantages: facilitating the manufacture of the active elements 4 in the form of independent bars, simplifying the assembly and disassembly of the active elements 4 in the stator S and of the magnetothermal converter 2 in general, standardizing the components and reducing production costs, simplifying the fluidic circuit and reducing pressure loss by shortening the piping. This annular machine and active element configuration in the shape of a bar also makes it possible to easily increase the power of the machine by increasing the length of the bars of active elements 4, therefore the length of the machine, without increasing its radial dimension, which is advantageous in terms of machine compactness and size. Of course, the annular configuration of the magnetothermal converter 2 can be laid flat in the case of a linear and non-rotating machine.

FIGS. 5 and 6 illustrate an example of a conversion machine 1 according to the invention, without a cover, provided with bases 22 allowing the machine to be fixed on any receiving surface. The electromechanical converter 3 coupled with the magnetothermal converter 2 is preferably an electric generator arranged to produce electric energy E (see FIG. 2) from the mechanical energy transmitted by the rotor R of the magnetothermal converter 2. The rotor 23 of the electric generator is therefore coupled with the rotor R, either directly (see FIG. 2), or by means of a speed reducer or multiplier 24, making it possible to adapt the speeds of the two rotors 23, R (see FIG. 6). These FIGS. 5 and 6 illustrate the rotational guidance of the outer rotor 14 by means of rollers 25 on bearings, this example remaining non-limiting.

FIG. 5 further illustrates the fluidic synchronization and distribution system. It comprises the fluidic distributors 10 located on an axial end of the stator S and distributed radially around the axis X. They are controlled in this example by the rotor R of the magnetothermal converter 2 by means of a cam transmission 26 which makes it possible to alternately operate the spool valves 27 of the fluid distributors 10. The switching frequency is synchronized automatically with the rotation speed of the rotor R. This example is non-limiting as explained previously.

Figure 8:
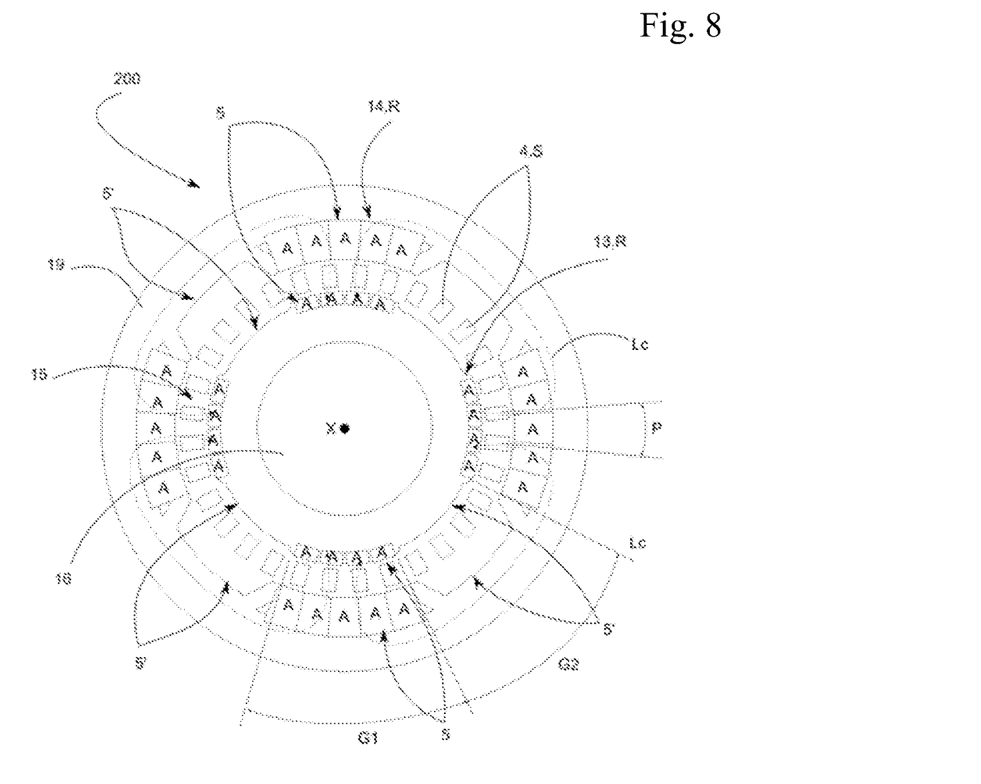
FIG. 8 is a plan view of the magnetothermal converter of the machine of FIG. 2, according to another embodiment.

FIG. 8 is a view similar to FIG. 3 and illustrates a magnetothermal converter 200 according to another variant embodiment of the rotor R. In this example, the rotor R also consists of an inner rotor 13 and an outer rotor 14 radially superimposed, the two being separated by an air gap 15 in which is housed the stator S and the active elements 4. In this example, the inner 13 and outer 14 rotors are designed very simply, since the magnetic poles 5 of each of the rotors 13, 14 consist of magnets A or ferrites, and the non-magnetic poles 5' are empty. As in the previous example, the number of active elements 4 is a multiple of the number of magnetic 5 and non-magnetic 5' poles, and for example equal to 32, i.e., a multiple of 4 for 8 poles.

FIG. 7 illustrates an exploded view of another example of conversion machine 100 according to the invention designed in a modular manner to make it possible to adapt its structure to the electrical power that you would like to produce. It comprises two magnetothermal converters 2, superimposed axially in the axis X, this example remaining non-limiting. In this case, two stators S are provided: one stator S in each magnetothermal converter 2. This example is also non-limiting since the number of stators S or supports 12 can be greater than one. In this example, the configuration of the rotors R and the stators S is different from the previous example. It is no longer an annular but discal configuration, which may also be suitable in some cases. The rotors R are disc-shaped and each comprise two diametrically opposed magnetic poles 5, supported by a magnetic plate 28. The two magnetic poles 5 are alternated with two non-magnetic poles 5' which have remained empty. The number of magnetic poles 5 is of course non-limiting and may be greater than two. The magnetic poles 5 are each formed by a magnetic assembly A oriented radially. The rotor R of each magnetothermal converter 2 comprises two identical rotors 130, 140, axially superimposed, arranged in a mirrored manner with respect to a plane perpendicular to the axis X, and defining between them an air gap 15 wherein a stator S is housed. Each stator S is also in the form of a disc and comprises active elements 4 (not shown) oriented radially opposite magnetic poles 5 and non-magnetic poles 5'. This modular assembly is assembled in a preferably non-magnetic casing 29, forming a cover, supported by bases 22. As in the example of FIGS. 5 and 6, the fluidic distributors 10 are located at an axial end of the stator S and distributed radially around the axis X. Contrary to the previous example, the fluidic passages provided in the active elements 4 open radially and require a greater length of piping to be connected to the fluidic distributors 10 than in the annular configuration described with reference to FIGS. 3 to 6 and 8. The fluidic distributors 10 are controlled by the rotors R of the magnetothermal converters 2 via a cam transmission 26 which makes it possible to alternately actuate the spool valves 27 of the fluidic distributors 10. In this modular configuration, the active elements 4 can of course be connected in series, in parallel or according to a series-parallel combination in said fluidic circuit 6.

The conversion machine 1, 100 according to the invention is advantageously reversible and can operate in reverse, to convert electrical energy into thermal energy. In this case, it exploits the magnetocaloric effect of certain materials, which consists of a change in temperature of a magnetic material exposed to an external magnetic field. This technology used to create magnetic cooling has been known for more than thirty years and we know the advantages it provides in terms of ecology and sustainable development. It can use the same magnetic phase transition materials as those described above, but using their magnetocaloric effect. An example is described in particular in the publication WO 2008/012411.

In addition, the configuration of the magnetothermal converter 2, 200 which has been thought out and designed to exploit waste heat as efficiently as possible and with the highest possible output, lends itself particularly well to the production of magnetic cooling. Consequently, the conversion machine 1, 100 illustrated in FIGS. 2 to 8, can operate in magnetic cooling mode, only the electric generator 3 is replaced by an actuator, such as an electric motor or similar, coupled with the rotor R to expose the active elements 4 to a variable magnetic field and alternately create in said active elements 4 a magnetocaloric heating cycle and a magnetocaloric cooling cycle. The fluidic circuit 6 remains the same and the heat exchangers S1 and S2 respectively become the heat and cooling exchangers of the magnetic cooling machine. All the other components of the magnetothermal converter 2, 200 are identical.

In addition, the active elements 4 can comprise several types of magnetocaloric materials and react at different temperatures, which generates a thermal gradient along the active elements 4. Therefore, the magnetocaloric materials constituting the active elements 4 can have different Curie temperatures, organized in ascending or descending order, having the effect of generating temperature gradients of greater amplitude. When the active elements 4 are in the form of bars, the bars may consist of successive sections or blocks of different magnetocaloric materials having ascending or descending Curie temperatures.

The present invention is of course not limited to the embodiments described, but extends to any modification and variant obvious to a person skilled in the art within the limits of the annexed claims. The variant embodiments indicated for one of the examples of embodiment obviously apply to the other examples of embodiment.

The invention claimed is:

1. A conversion machine for converting thermal energy into electrical energy, or conversely, electrical energy into thermal energy, said conversion machine comprising at least one magnetothermal converter arranged to convert a temperature variation into mechanical energy or a magnetic field variation into thermal energy, said magnetothermal converter comprising active elements with magnetic or thermal phase transition, and a thermal or magnetic modulation unit arranged to expose said active elements to a temperature variation or to a magnetic field variation having for effect to respectively vary the magnetic state of said active elements or the temperature of said active elements, and at least one closed circuit inside said magnetothermal converter, wherein a heat-transfer fluid circulates in a closed circuit through said active elements and at least one heat exchanger, arranged to thermally couple said active elements with at least one external device by means of said at least one heat exchanger, said magnetothermal converter comprising a fixed stator provided with said active elements, said active elements being distributed in said stator into a first group of active elements in a first magnetic or thermal state, and into a second group of active elements in a second magnetic or thermal state different from said first magnetic or thermal state, the active elements of the first group being alternated with the active elements of the second group so as to create an alternation between active elements in said first magnetic or thermal state and active elements in said second magnetic or thermal state, and said magnetothermal converter further comprising at least one mobile rotor shifting or rotating in relation to said stator, said rotor being equally provided with magnetic poles and non-magnetic poles alternated and regularly distributed, such that they each extend over an angular sector of the same value, the alternating arrangement of the magnetic poles and the non-magnetic poles corresponding to the alternating arrangement of the active elements of said first group and active elements of said second group, such that when an active element of said first group faces a magnetic pole, an active element of said second group faces a non-magnetic pole, and vice versa.

2. A conversion machine according to claim 1, wherein said magnetothermal converter comprises a fixed magnetic frame superimposed on said rotor to delimit between them an air gap wherein is arranged said stator, said magnetic frame being arranged to channel the magnetic flow and close the field lines of the magnetic poles of said rotor through said stator and said active elements.

3. A conversion machine according to claim 1, wherein said magnetothermal converter comprises two rotors superimposed to delimit between them an air gap wherein said stator is arranged, the two rotors having the same number of magnetic and non-magnetic poles, and being arranged to channel the magnetic flow and close the field lines of the magnetic poles of the two rotors through said stator and said active elements, and wherein the two rotors are coupled together by mechanical connection or by magnetic coupling.

4. A conversion machine according to claim 1, wherein said stator comprises or forms a thermally insulating support, on which are fixed said active elements, as well as fluidic connections to allow said fluidic circuit to communicate with said active elements, and wherein said active elements are distributed over said stator and separated from each other by a pitch preferably regular and as small as possible to maximize the quantity of active elements in said stator.

5. A conversion machine according to claim 1, wherein said stator comprises a number of active elements which is a multiple of the number of magnetic and non-magnetic poles of said at least one rotor.

6. A conversion machine according to claim 1, wherein said fluidic circuit comprises said heat-transfer fluid selected from the group comprising an aqueous solution with or without additive, a gaseous medium, a liquefied gas, a petroleum product, and wherein said active elements comprise fluidic passages to allow said heat-transfer fluid to circulate through said active elements.

7. A conversion machine according to claim 1, wherein said fluidic circuit comprises a pump, two heat exchangers and two circulation loops for said heat-transfer fluid connected in parallel by a synchronization system, and wherein said synchronization system is arranged to connect said active elements respectively from said first group and from said second group in series with said heat exchangers alternately in one and the other of said circulation loops and creating an alternation of thermal or magnetocaloric cycles at a determined switching frequency.

8. A conversion machine according to claim 7, wherein said synchronization system comprises fluidic distributors controlled according to said determined switching frequency by an actuator selected from mechanical, hydraulic, electric and/or electronic actuators, and arranged to circulate said heat-transfer fluid alternately in said active elements in one direction in said first circulation loop, and in the opposite direction in said second circulation loop.

9. A conversion machine according to claim 8, wherein said fluidic distributors are controlled by said at least one rotor of the magnetothermal converter and a mechanical cam transmission by a variable-speed auxiliary motor and a mechanical cam transmission, or by a programmable electric or electronic cam.

10. A conversion machine according to claim 7, wherein the said fluidic circuit comprises a buffer tank of heat-transfer fluid connected in series with each of the said circulation loops.

11. A conversion machine according to claim 7, wherein the said fluidic circuit further comprises control units for the direction of circulation of said heat-transfer fluid arranged to make the heat-transfer fluid circulate in each of the said heat exchangers in a single direction of circulation.

12. A conversion machine according to claim 1, wherein said active elements comprise at least one of the magnetocaloric materials selected in the group comprising gadolinium, a gadolinium alloy, an iron alloy, a manganese alloy, a lanthanum alloy, said alloys comprising at least one of the materials selected in the group comprising at least silicon, germanium, iron, magnesium, phosphorous, manganese, hydrogen, arsenic, or a combination of some of said materials.

13. A conversion machine according to claim 12, wherein the said magnetocaloric material has one of the forms selected from the group comprising a sheet, a porous block, a block of sheets, a pellet, powder, an agglomerate of pieces.

14. A conversion machine according to claim 1, wherein said magnetothermal converter has an annular configuration, said stator and said at least one rotor being superimposed radially and extending axially, wherein at least one part of fluidic passages provided in said active elements opens axially, and wherein fluidic connections are arranged in at least one axial end of said stator.

15. A conversion machine according to claim 14, wherein the said active elements are in the form of bars, extending axially into said stator, and each consisting of a block of porous material or of a block of sheets of material superposed and delimiting said fluidic passages between them.

16. A conversion machine according to claim 1, wherein the magnetic poles of said at least one rotor are obtained by a magnetic assembly selected from the group comprising one or more permanent magnets, ferrites, an electromagnet, a superconducting magnet, a superconducting electromagnet, a superconductor, a combination of these solutions, and wherein the non-magnetic poles of the said at least one rotor are obtained by the absence of magnetic assembly.

17. A conversion machine according to claim 1, further comprising several magnetothermal converters connected in series, in parallel, or in a series-parallel combination.

18. A conversion machine according to claim 1, wherein the said active elements comprise an assembly of several magnetocaloric materials of different Curie temperatures, organized in ascending or descending order.

19. A conversion machine according to claim 1, intended to convert electrical energy into thermal energy, further comprising an actuator coupled with said at least one rotor of said magnetothermal converter to expose said active elements to a variable magnetic field and alternately create in said active elements a magnetocaloric heating cycle and a magnetocaloric cooling cycle, wherein said fluidic circuit is coupled on the one hand with said stator to collect the thermal energy produced by said active elements, and on the other hand to an external device by means of at least one heat exchanger in order to transfer the thermal energy produced and simultaneously isolating said conversion machine from said at least one external device, wherein said magnetic modulation unit comprises said at least one rotor, and a synchronization system arranged to synchronize the circulation of the heat-transfer fluid from the fluidic circuit in the said active elements with the said magnetocaloric cycles.

20. A conversion machine according to claim 1, intended to convert thermal energy into electrical energy from a first thermal source at a first temperature and from a second thermal source at a second temperature different from the first temperature, further comprising an electromechanical converter coupled with said at least one rotor of said magnetothermal converter to convert mechanical energy into electrical energy, wherein said fluidic circuit is coupled on the one hand with said first thermal source by means of a first heat exchanger and to said second thermal source by means of a second heat exchanger to collect thermal energy and simultaneously isolating said conversion machine from said thermal sources, and is coupled on the other hand with said stator to transfer the thermal energy collected to said active elements, and wherein said thermal modulation unit comprises a synchronization system arranged to expose said active elements to temperature variations, generating a permanent magnetic imbalance between said at least one rotor and said stator, and producing the displacement of said at least one rotor to create said mechanical energy.

21. A conversion machine according to claim 20, wherein the said electromechanical converter is an electric generator, the rotor of said electric generator being coupled to said at least one rotor of said magnetothermal converter directly or by means of a speed reducer or multiplier to adapt the speeds of said rotors.

22. Use of a machine for converting thermal energy into electrical energy according to claim 20 for recovering thermal energy from waste heat lost in a temperature range of −100° C. to +100° C.

23. Use of a conversion machine according to claim 22, wherein the temperature difference between the first thermal source and the second thermal source is at least equal to 10° C.

* * * * *